(12) United States Patent
Parker et al.

(10) Patent No.: US 7,099,288 B1
(45) Date of Patent: Aug. 29, 2006

(54) TELEPHONIC ADDRESSING FOR ESTABLISHING SIMULTANEOUS VOICE AND COMPUTER NETWORK CONNECTIONS

(75) Inventors: Benjamin J. Parker, Overland Park, KS (US); Shane R. Werner, Olathe, KS (US); Charles Diaz, Overland Park, KS (US); Terry M. Frederick, Lenexa, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 964 days.

(21) Appl. No.: 10/033,813

(22) Filed: Dec. 20, 2001

Related U.S. Application Data

(63) Continuation-in-part of application No. 09/978,616, filed on Oct. 16, 2001, now Pat. No. 6,545,697.

(51) Int. Cl.
*H04L 12/16* (2006.01)
*H04N 7/14* (2006.01)

(52) U.S. Cl. .................... 370/259; 348/14.01; 370/352

(58) Field of Classification Search ................ 370/259, 370/271, 351–356, 389, 392–393, 463; 348/14.01, 348/14.04; 379/201.01, 201.02, 201.12, 379/207.02, 207.14, 207.04, 157; 455/414.1
See application file for complete search history.

(56) References Cited

U.S. PATENT DOCUMENTS

| 4,710,917 | A | * | 12/1987 | Tompkins et al. ........... 709/204 |
|---|---|---|---|---|
| 5,642,410 | A | * | 6/1997 | Walsh et al. ............. 379/201.04 |
| 5,689,553 | A | | 11/1997 | Ahuja et al. |
| 5,764,916 | A | | 6/1998 | Busey et al. |
| 5,949,763 | A | * | 9/1999 | Lund ............................ 370/261 |
| 6,097,793 | A | * | 8/2000 | Jandel ....................... 379/93.23 |
| 6,201,562 | B1 | * | 3/2001 | Lor ............................ 348/14.01 |
| 6,337,858 | B1 | * | 1/2002 | Petty et al. .................. 370/356 |
| 6,370,137 | B1 | | 4/2002 | Lund |
| 6,539,011 | B1 | * | 3/2003 | Keenan et al. ............... 370/352 |
| 6,539,077 | B1 | * | 3/2003 | Ranalli et al. .............. 379/67.1 |
| 6,674,745 | B1 | * | 1/2004 | Schuster et al. ............ 370/352 |
| 6,690,672 | B1 | * | 2/2004 | Klein .......................... 370/401 |
| 6,693,893 | B1 | * | 2/2004 | Ehlinger ..................... 370/352 |
| 6,704,294 | B1 | * | 3/2004 | Cruickshank ............... 370/265 |
| 6,704,305 | B1 | * | 3/2004 | Emerson, III ............... 370/352 |
| 6,775,366 | B1 | * | 8/2004 | Cobbett et al. ......... 379/201.02 |
| 2001/0049745 | A1 | * | 12/2001 | Schoeffler .................... 709/238 |
| 2002/0065828 | A1 | * | 5/2002 | Goodspeed ................. 707/100 |
| 2004/0014456 | A1 | * | 1/2004 | Vnnen ......................... 455/413 |

FOREIGN PATENT DOCUMENTS

| EP | 0 721266 | 7/1996 |
|---|---|---|
| EP | 0 999712 | 5/2000 |
| EP | 1 059 798 | 12/2000 |
| GB | 2357659 | 6/2001 |
| WO | WO 01/71994 | 9/2001 |

* cited by examiner

*Primary Examiner*—Chau Nguyen
*Assistant Examiner*—Kerri M. Dyke

(57) ABSTRACT

A user system uses a called number to establish a telephone call over a public telephone network to a called party. In response to the telephone call, the user system transfers a data call request to a server system over a public data network. The server system uses the called telephone number to check a database to determine if the called party is ready to receive data calls. If the called party is ready and accepts the data call, the server system exchanges computer data between the caller and called parties over the public data network.

13 Claims, 12 Drawing Sheets

TELEPHONIC ADDRESSING FOR ESTABLISHING SIMULTANEOUS VOICE AND COMPUTER NETWORK CONNECTIONS

CROSS REFERENCE TO RELATED APPLICATION

The present application is a continuation-in-part of U.S. application Ser. No. 09/978,616, filed Oct. 16, 2001, entitled "Video Telephony," now U.S. Pat. No. 6,545,697, issued Apr. 8, 2003.

BACKGROUND OF THE INVENTION

The present invention relates to establishing a communication session between users connected to a computer network, and more specifically, to exchanging computer networking data packets over a public data network simultaneously with a telephone call placed over a public telephone network.

Internetworking (i.e., the interconnection of many computer networks) allows the interaction of very large numbers of computers and computer users. The most well known example is the Internet. Computers connected to the Internet may be widely separated geographically and utilize many different hardware and software configurations. In order to achieve communication sessions between any two endpoints on the Internet, an addressing system and various standard protocols for exchanging computer data packets have been developed.

Each packet sent over the Internet includes fields that specify the source and destination address of the packet according to Internet Protocol (IP) addresses assigned to the network interface nodes involved. Currently assigned addresses comprise 32 bits, although future standards allow for 128 bit addresses. The 32 bit addresses are normally written by breaking the 32 bits into 4 groups of 8 bits each and writing the decimal equivalents of each group separated by periods (e.g., 208.25.106.10).

Since numerical IP addresses are inconvenient to use and remember, a protocol for assigning and accessing logical names is used known as the domain name system (DNS). DNS servers are deployed within the Internet which perform a translation function between a logical domain name such as "sprint.com" and its numerical equivalent "208.25.106.10". After receiving an IP address back from a DNS server, a computer can forward data packets to the IP address and establish a connection or session with the remote computer.

While the DNS system works well for hosted content (e.g., material made available for browsing by commercial and private entities), it is not well suited to ad hoc communications or exchanges of data between individuals. Hosting a website and registering an IP address within the DNS system is expensive and time consuming. Furthermore, due to an impending shortage of IP addresses and the cost for maintaining use of each IP address, many Internet service providers assign IP addresses dynamically to their individual users. In other words, when a user signs on to their service, they are temporarily assigned an IP address from an address pool assigned to their service provider. The user occupies that IP address only for their current session.

Even when individual users have their own static IP addresses, and when other users can remember the IP address of a user with whom they would like to establish a connection session over the Internet (e.g., for voice or video telephony), the need to configure their hardware or software is too complex for many users. This is one reason why e-mail is such a popular and successful Internet application. A mail server with an easy to remember domain name acts as intermediary between two individual users. Using a simple application program and the recipient's account name on the mail server (i.e., their e-mail address), text messages and computer files can be exchanged. The exchange, however, does not allow the users to interact in real time. Thus, there is a need for a way to allow two or more individual users to establish interactive connection sessions over the Internet without requiring overt knowledge of the other's IP address and without complicated configurations or set-ups.

The present invention is also directed to advances in video telephony. Video telephony comprises the exchange of both audio and video between a caller and called party. If video telephony were deployed on a large scale, it would dramatically improve user-to-user communications and provide greater efficiency to business entities. For example, large-scale video telephony would significantly reduce business travel expenses. Unfortunately, the mass deployment of video telephony has failed to materialize.

Various systems have been developed to provide video telephony. For example, computers can be used to place video calls over the Internet (provided the IP addresses of both parties are explicitly known in advance). Alternatively, video telephones can be used to place video calls over video telephone networks. Unfortunately, these video telephony systems are complex to install and operate, and they are often expensive. The cost and complexity has inhibited mass deployment. There is a need for video telephony technology that is easier to install and operate, and that is more inexpensive than current systems.

SUMMARY OF THE INVENTION

The present invention solves the problem of determining the IP address at which an Internet user can be reached by introducing a central server that stores information associating each registered user's IP address with identifying information well known or easily discovered by other users, namely their telephone number. In addition, a telephone call is established simultaneously with establishing the computer network session, thereby enhancing the user interaction regardless of the type of computer data to be exchanged (e.g., video frames, computer files, etc.). In one embodiment, the computer network session is automatically established in response to the act of dialing a person's number on a telephone.

In one important aspect of the invention, a method is provided for connecting at least two users via an internetwork, wherein each user has a respective assigned IP address for the internetwork and a respective assigned telephone identifier number for a public-switched telephone network. The method includes the step of maintaining in a server coupled to the internetwork a database of registered users. The database includes for each registered user a respective telephone identifier number and a respective IP address. An access request to establish a data transfer to a desired user on the internetwork is received in the server. The access request includes a target telephone identifier number associated with the desired user. The target telephone identifier number is compared with the telephone identifier numbers in the database. If the target telephone identifier number is found in the database, then an initiation message is forwarded to the desired user using a respective IP address stored in the database.

DETAILED DESCRIPTION OF PREFERRED EMBODIMENTS

FIGS. 1–17 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
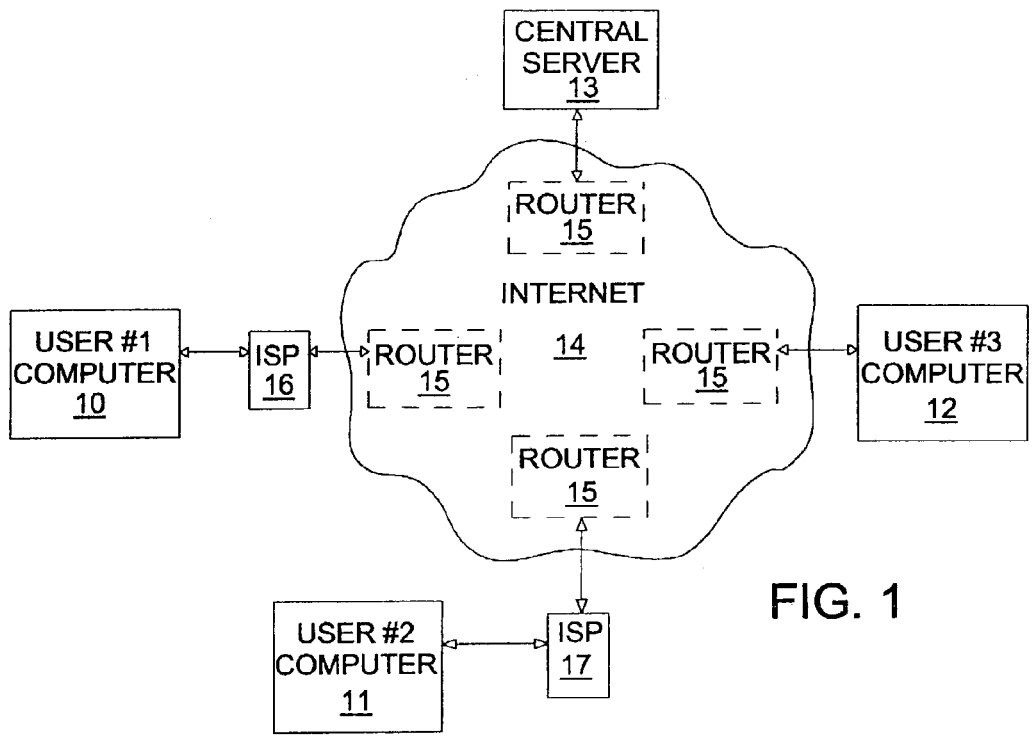
FIG. 1 is a block diagram showing the interconnection of users over the Internet to the central server of the present invention.

Referring to FIG. 1, a plurality of user computers 10, 11, and 12, and a central server 13 are internetworked via the Internet 14. A plurality of routers 15 within Internet 14 direct packets between various endpoints or nodes. Computers 10 and 11 are shown as being connected to Internet routers belonging to Internet Service Providers (ISP's) 16 and 17, respectively. The connections to the ISP's may be by dial-up, digital subscriber line (DSL), cable modem, or integrated access device (IAD), for example. Central server 13 and computer 12 are shown directly connected to a router.

Network communication comprises data messages or packets transferred between separate endpoints, such as between between computers 10, 11, or 12 (as clients) and central server 13. The packet transfer is accomplished by routers 15 using the IP addresses contained in each packet. Central server 13 typically has a fixed IP address that is listed on the DNS servers accessible to each computer. Each computer user can easily communicate with central server 13 by supplying its logical name (e.g., www.sprint.exchange.com) which is automatically resolved by their browser into an IP address by consulting a DNS server. Exchanging packets between users 10, 11, and 12 themselves cannot usually be accomplished in the same way because the users and their IP addresses are not listed in the DNS system.

Figure 2:
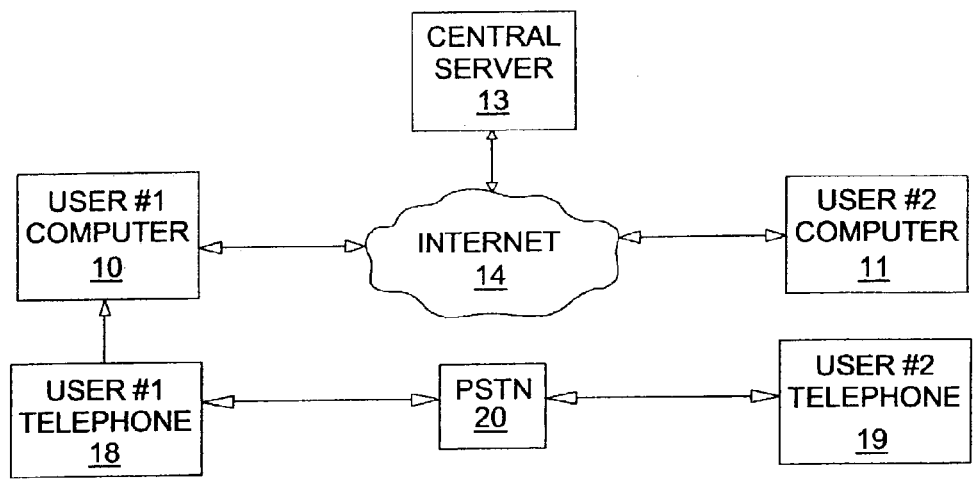
FIG. 2 is a block diagram showing a user connection model of the present invention.

The present invention facilitates exchanging data messages between two individual users by providing a specialized directory or look-up within central sever 13. As shown in FIG. 2, the present invention preferably functions to simultaneously establish a voice telephone call between the two individual computer users. In certain embodiments, the voice call serves as the user action that initiates the computer processing to establish the computer-to-computer connection. In addition, the voice call provides a way to alert the called party of the requests to establish the computer connection and then serves to enhance the interaction between the two users during the exchange of computer data. However, the present invention also provides other methods for initiating the computer processing, and a simultaneous voice telephone call is not necessary in the present invention.

Regarding the embodiment with a simultaneous voice telephone call in FIG. 2, computers 10 and 11 have associated telephones 18 and 19 used by the same respective users. The computers and telephones may be fixed installations (e.g., in a residence or a business office) or may be mobile devices (e.g., laptop computer and cellular phone), as long as both are accessible to each user at the same time. The telephones are connected to the public switched telephone network (PSTN) 20. Central server 13 provides a user look-up and interconnecting service for registered users. For security and/or billing purposes, access to the service preferably is tied to user ID's and passwords. A user may be given an ID and password with initial sign-up for the service. Each user would manually configure the telephone number that they want to be associated with. When the user is "on-line" (i.e., has their computer turned on and connected to Internet 14), their computer sends a registration message to central server 13 to notify it that the user is available. Central server 13 can inspect the registration message to determine the current IP address and port number at which the user resides for its current connection session. Alternatively, the user may manually configure their IP address in some circumstances. In any case, central server 13 contains a database of currently active, registered users. Each user entry in the database includes fields for user ID, password, telephone number, and IP address (including port number), and user status, for example.

In the connection model of FIG. 2, a user #1 dials telephone 18 to make a voice call to a user #2 at telephone 19. The telephone number dialed by user #1 is captured as a target telephone identifier number and sent to computer 10 being used by user #1. Computer 10 forwards the target telephone number to central server 13 as part of an access request for establishing a connection with user #2. Central server 13 looks up the target number in its database. When it finds the target number, central server 13 identifies the IP address associated with user #2 and sends an initiation message to computer 11 being used by user #2. The initiation message identifies user #1 (preferably by both telephone number and user ID) and the type of data to be exchanged (i.e., the application program to receive the data). User #2 answers the telephone voice call and learns that an initiation message was sent to their computer. Using computer 11, user #2 can verify the calling party as user #1 and can indicate whether they accept the computer network connection with user #1. Once user #2 accepts, data messages can be exchanged between application programs running on computers 10 and 11. The application programs can be written to perform file transfers of various types of files, video data or frames for video telephony, or other real-time data or control signals. Data exchange can continue until either user deactivates their application program.

Figure 3:
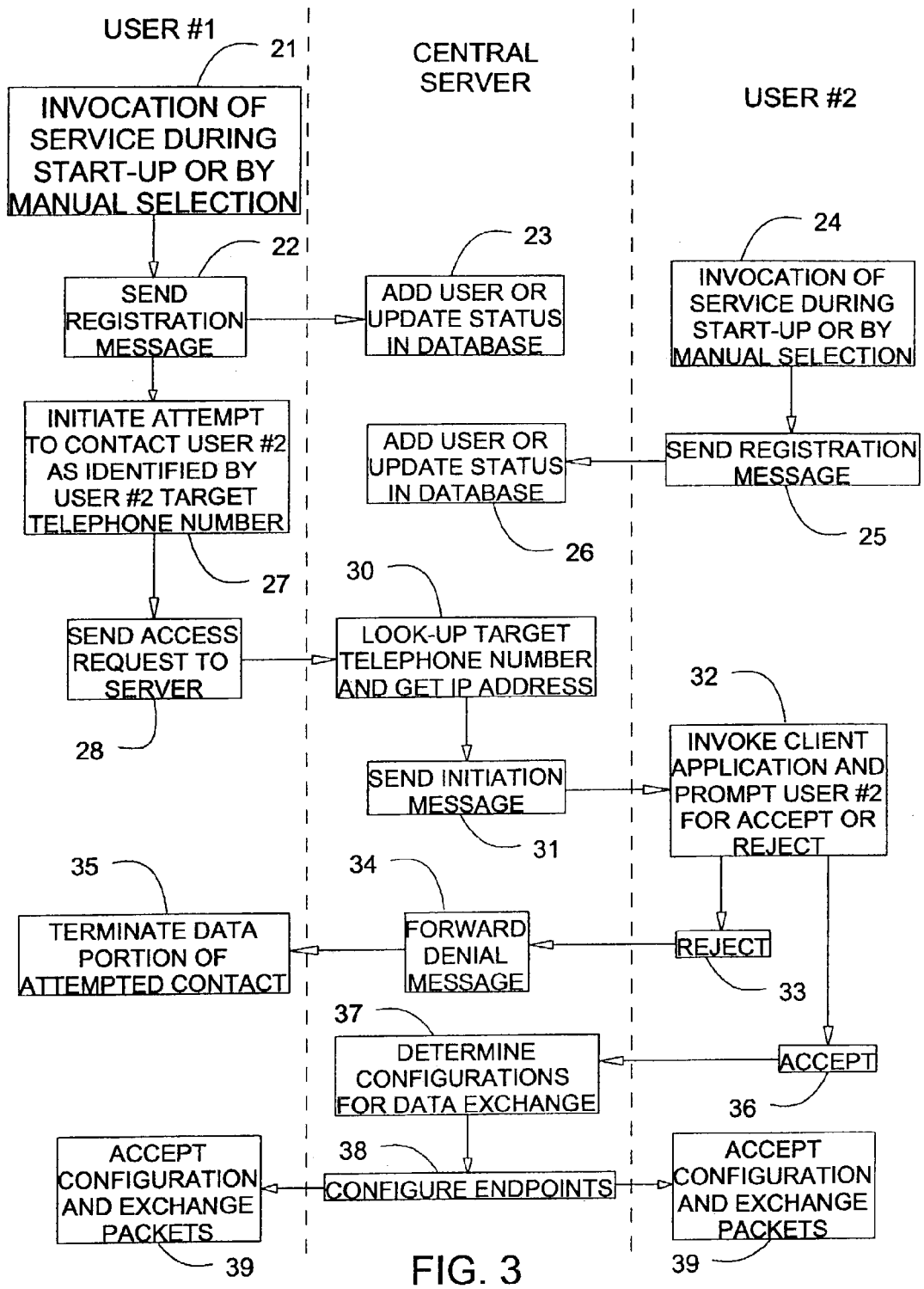
FIG. 3 is a flow diagram of one preferred embodiment of the invention.

The sequence of events occurring in the present embodiment is shown in greater detail in FIG. 3, in which user #1 events are in the left column, central server events in the center column, and user #2 events in the right column. In step 21, user #1 invokes the real-time interconnection service of the present invention. This can be configured as part of the normal start-up of their computer or can result from manually launching a software application or client program after start-up has finished. When the service is invoked by user #1, a registration message is sent to the central server in step 22. The registration message preferably includes the user ID and password assigned to user #1. The registration message would typically also include the telephone number being used by user #1 and an IP address. Although the IP address may be explicitly added to the message by user #1, the IP address (and port number) is typically embedded in each packet forwarded by the network and the central server preferably extracts the automatically embedded IP address and port number so that the user does not need to know it. Alternatively, the telephone number and/or IP address may have been configured on the central server during a previous connection session of user #1, in which case the registration message only needs to contain the user ID and password so that the central server knows that user #1 is active and ready to receive data calls. In step 23, the central server receives the registration message and adds the new user to the database or updates the user status, as necessary.

Separately, user #2 invokes the real-time interconnection service in step 24. User #2 sends a registration message in step 25, and the central server receives the registration message and adds user #2 to the database or updates the user status in step 26, as necessary. Thereafter, the central server may periodically exchange further messages with each registered user to keep the user status current and to maintain an open session with each user, for example. When a user shuts down their application program or their computer, an unregister message (not shown) may also be sent to the central server.

During the time that user #1 is on-line, it is desired to exchange computer data with user #2. In step 27, user #1 initiates an attempt to contact user #2 and set up the data exchange. User #1 identifies user #2 by virtue of user #2's telephone number. This target telephone number may preferably be captured from the act of dialing it on user #1's telephone equipment. According to one example which is described in more detail below, a dedicated module may be connected to user #1's telephone to detect the DTMF tones while dialing and to send the dialed number to user #1's computer. The target telephone number for user #2 is included in an access request message sent to the central server in step 28.

In step 30, the central server looks up the target telephone number and gets the IP address (and port number) associated with user #2. The initiation message is sent by the central server in step 31.

User #2 receives the initiation message in step 32. If not already running, the user #2 computer launches the appropriate client application for responding to the initiation message and then prompts user #2 to either accept or reject the access request. If rejected, then user #2 generates a reject message in step 33 and sends it to the central server. In step 34, the central server forwards the reject message to user #1, which then terminates the data portion of the attempted communication session in step 35 (the voice telephone call is accepted, rejected, or terminated separately).

If user #2 accepts the attempted contact and the request for data exchange, then user #2 causes their computer to generate an accept message in step 36 (e.g., by clicking an "accept" button in an application interface) and sends it to the central server. In step 37, the central server determines any needed configurations for accomplishing the data exchange and then configures the user #1 and user #2 endpoints in step 38. The two main configurations for the data exchange will be described in connection with FIGS. 4 and 5. The user #1 and user #2 computers accept the configuration and then begin to exchange the data messages or packets in step 39. Other configuration issues, such as the configuration of the client application programs exchanging the actual data messages can be handled within the access request message, then initiation message, the accept message, and/or other packets exchanged between the endpoints, for example.

Figure 4:
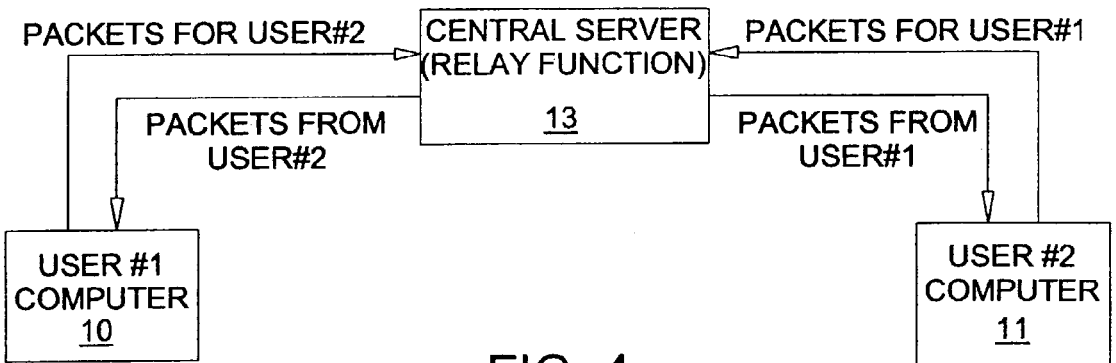
FIG. 4 is a block diagram showing a first embodiment of packet flow.

A first packet exchange configuration is shown in FIG. 4 wherein central server 13 performs a relay function such that all packets exchanged between computer 10 and computer 11 pass through central server 13. In other words, after a desired user (called party) accepts the data call and central server notifies the first user (calling party) of the acceptance, both endpoints continue to address their sent packets to central server 13. At central server 13, each packet is redirected by substitution of IP addresses. For example, a packet sent from computer 10 including its own IP address as the source address of the packet and the IP address of central server 13 as the destination address of the packet is modified after being received by central server 13 to have the central server's address as its source address and to have the IP address of computer 11 as its destination address. After modification, central server 13 sends the packet back to its router and on to computer 11. The same operations are used to send packets from computer 11 to computer 10. The embodiment of FIG. 4 has the advantage that greater privacy of a user's IP address is maintained since each user's computer only needs to see the IP address of central server 13. Furthermore, this configuration can readily function in the presence of network address translation (NAT) firewalls at the endpoints. Specific steps to deal with firewalls are shown in copending application U.S. Ser. No. 10/034,012, filed concurrently herewith, and incorporated herein by reference in its entirety.

Figure 5:
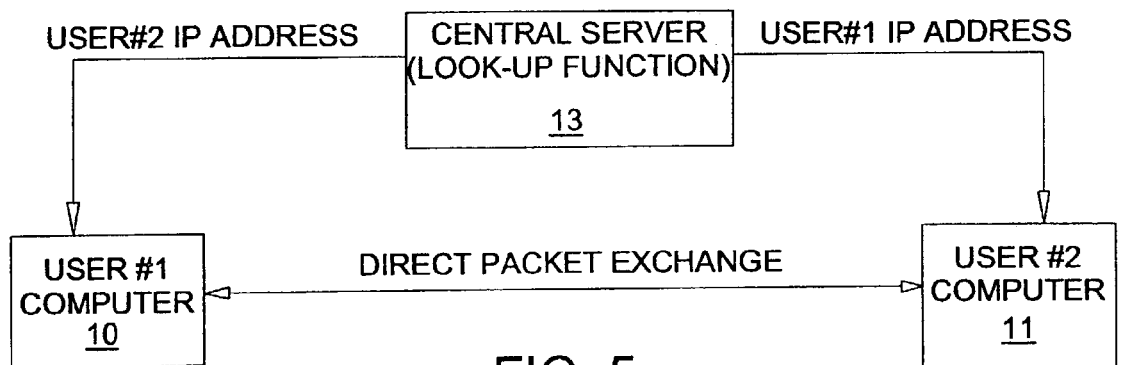
FIG. 5 is a block diagram showing a second embodiment of packet flow.

FIG. 5 shows an alternative configuration in which direct packet exchange between computers 10 and 11 is realized. Central server 13 provides a look-up function and a connection initiation function. If desired user #2 (called party) accepts a data call, then central server 13 provides the IP address of computer 11 to computer 10 and provides the IP address of computer 10 to computer 11. Thereafter, each computer can send packets addressed to the other computer and the packets are no longer relayed through central server 13. This embodiment has the advantage that central server 13 may be reduced in size since less traffic flows through it.

Figure 6:
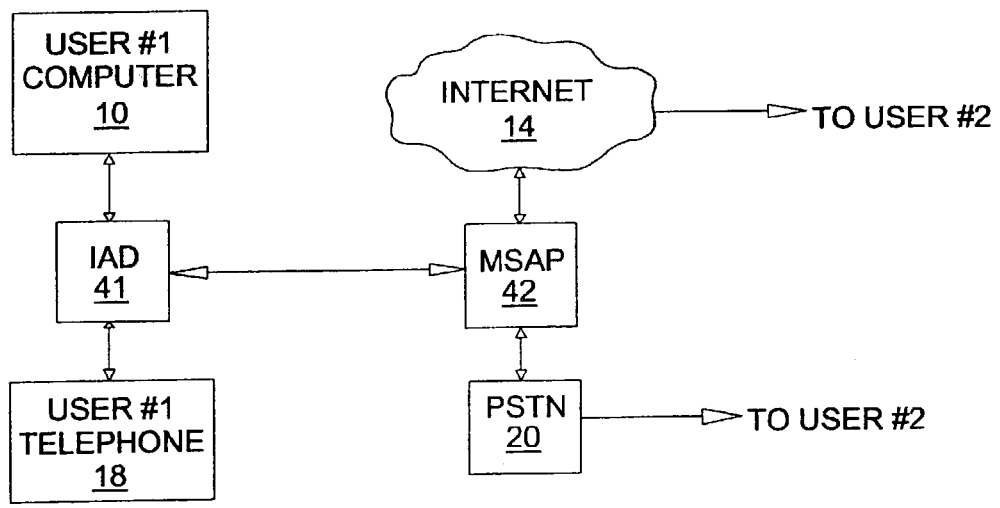
FIG. 6 is a block diagram showing an alternative embodiment of user equipment initiating the user connection of the present invention.

To initiate a data exchange or data call of the present invention, the target telephone number(s) must be presented to the central server. Most preferably, a simultaneous telephone call is being established along with the data call. One way in which to capture the called party's target telephone number is shown in FIG. 6. In this embodiment, user #1 utilizes a service provider that deploys an integrated access device (IAD) 41 with each user. Computer 10 and telephone 18 are each coupled to IAD 41. The service provider maintains a multi-service access platform (MSAP) 42 which connects to PSTN 20 and Internet 14. IAD 41 of user #1 and IAD's of other users are connected to MSAP 42. A high speed digital connection between IAD 41 and MSAP 42 carries all the voice telephony and computer data signals for user #1. MSAP 42 separates these separate signals out and routes them as appropriate to PSTN 20 or Internet 14. IAD 41 may be comprised of an IAD 1101 Integrated Access Device and MSAP 42 may be comprised of a 6732 Multiple Service Access Platform, each commercially available from Cisco Systems, Inc.

When initiating a telephone call via IAD 41, the called telephone number is detected as computer data and sent to MSAP 42 to establish a voice call. In the present embodiment, IAD 41 is modified to additionally send the called telephone number and the start time of the call to computer 10. In response, an application program running on computer 10 parses the information from IAD 41 and forwards an access request to the central server via the Internet.

Figure 7:
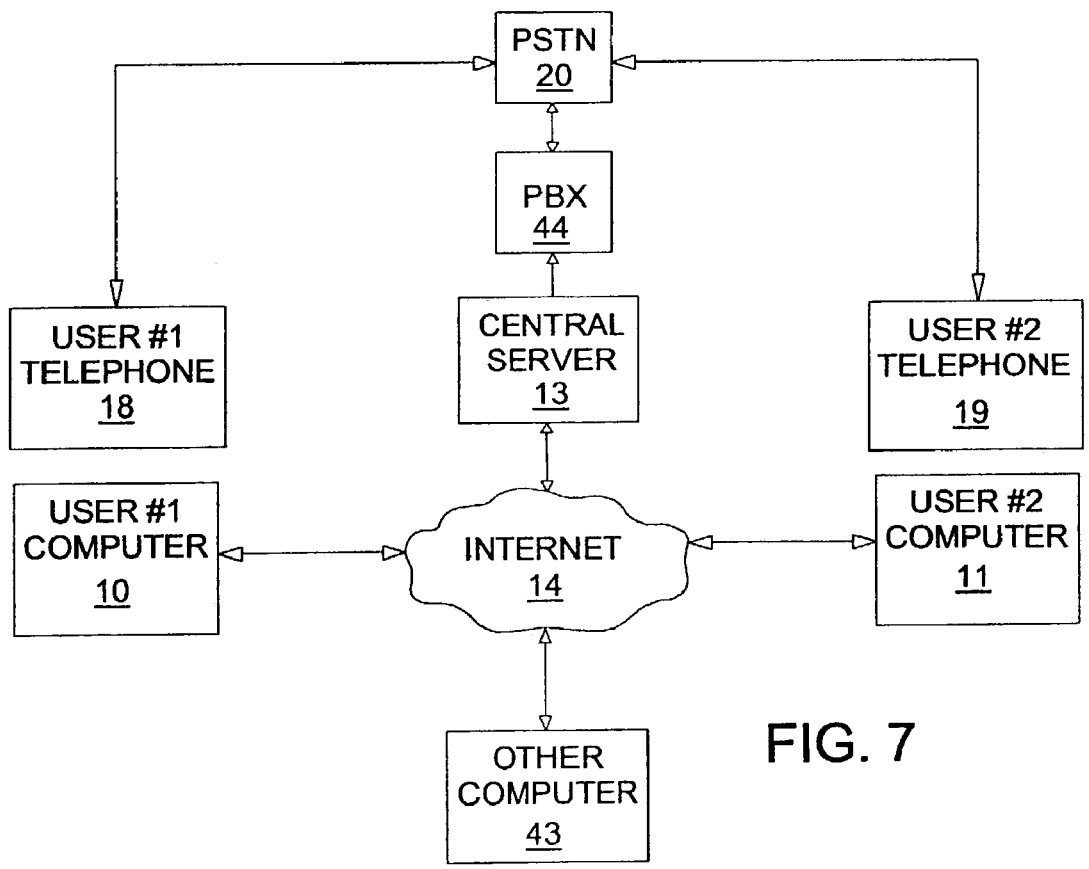
FIG. 7 is a block diagram showing an alternative embodiment for initiating a telephone call portion of the user connection from within the computer network.

In a further embodiment of the invention, the data call can be initiated from within the computer network rather than by the dialing of the telephone voice call. For instance, the first user may simply enter the desired user's target telephone number manually into the application program for exchanging the data messages. Alternatively, a network-based directory can be set up by a user and stored on central server 13 to facilitate making a data call. Furthermore, the data call initiation need not be done by the actual recipients of the data call. As shown in FIG. 7, another computer 43 connected to Internet 14 may generate an access request that identifies both user #1 and user #2 as called parties. Central server 13 could also initiate a data call itself, such as for a scheduled download that two users have set up in advance. Any such network initiated data call preferably also requires entry of appropriate user ID(s) and password(s).

Although a telephone voice call is not necessary, the embodiment of FIG. 7 shows how a voice call can still be established. In this embodiment, however, the telephone voice call is established in response to the initiation of the data call instead of the other way around. A private branch exchange (PBX) 44 is coupled to central server 13. As a data connection is being established, central server 13 triggers PBX 44 to initiate a telephone voice call over PSTN 20 to the target telephone numbers associated with each endpoint of the data call.

The use of the present invention in conjunction with video telephony will now be described in greater detail.

Figure 8:
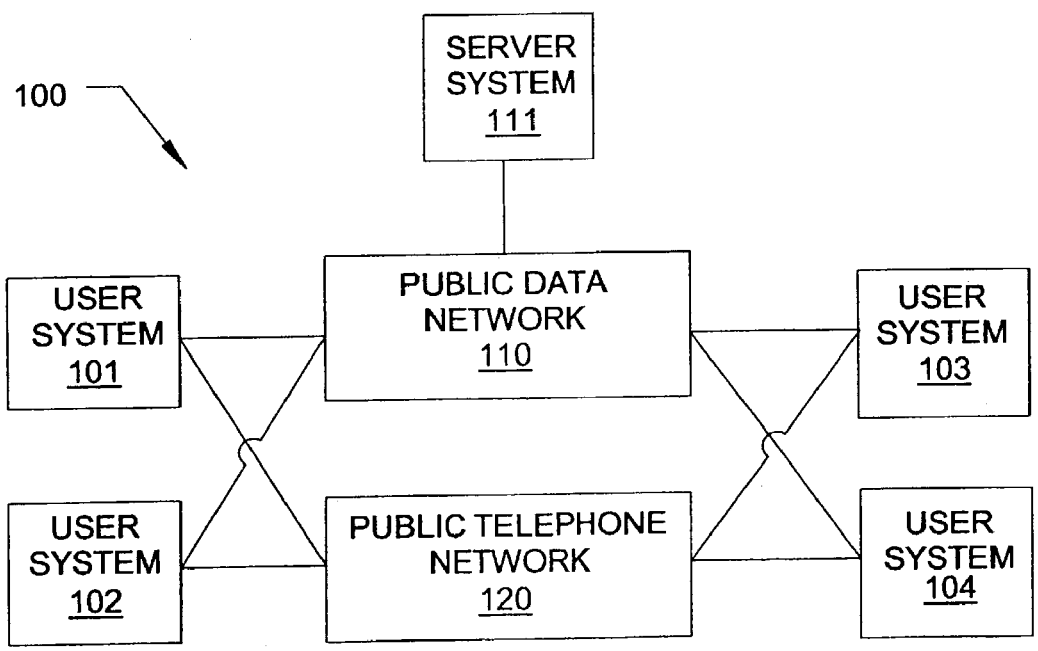
FIG. 8 illustrates a video telephony system in an example of the invention.
Figure 9:
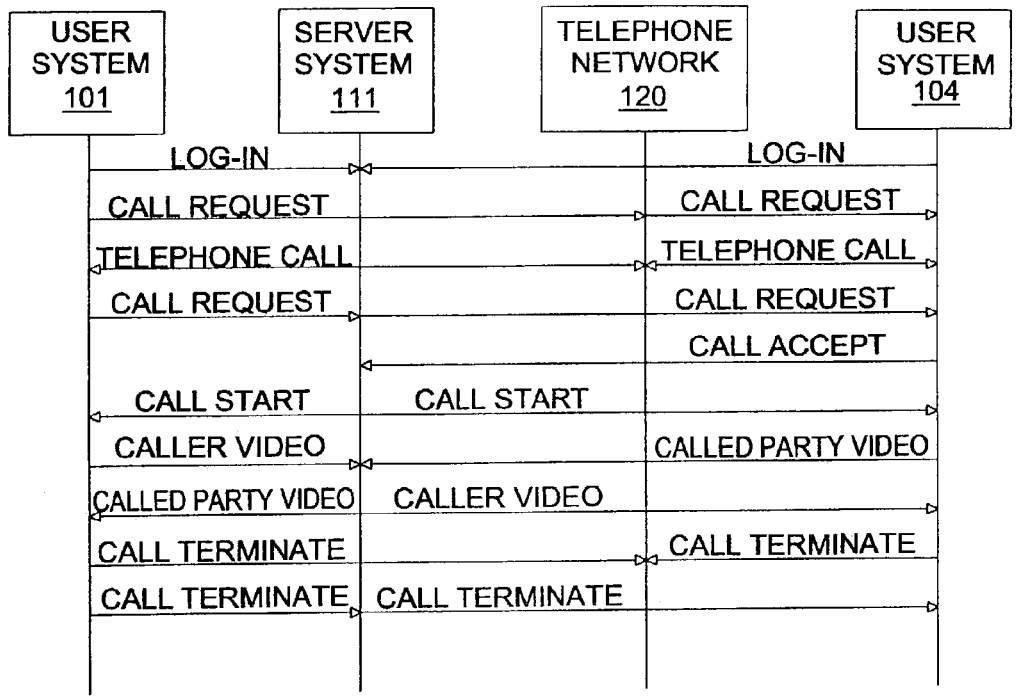
FIG. 9 illustrates video system operation in an example of the invention.

Video Telephony System Configuration and Operation—FIGS. 8–9

FIG. 8 illustrates video telephony system 100 in an example of the invention. Video telephony system 100 comprises user systems 101–104, public data network 110, server system 111, and public telephone network 120. User systems 101–104 communicate with one another and with server system 111 over public data network 110. User systems 101–104 also communicate with one another over public telephone network 120.

Although various systems could be used within the context of the invention, a few exemplary systems are given for illustrative purposes. Examples of public telephone network 120 include local and long distance telephone companies. Examples of public data network 111 include Internet service providers and the Internet. Server system 111 could be a conventional Internet server configured with software to implement the invention. User systems 101–104 could include a conventional telephone and personal computer in addition to special purpose circuitry and software to implement the invention.

FIG. 9 illustrates video system 100 operation in an example of the invention. Public data network 110 is not shown for clarity, although it should be appreciated that communications with server system 111 occur over public data network 110. Before a video call, both users systems 101 and 104 transfer log-in messages to server system 111 when they are ready to initiate and/or receive video calls. The log-in messages generally include user names and passwords, user data addresses and telephone numbers, and any video call preferences. Server system 111 checks the passwords against the user names, and if they are valid, associates each related user name/data address/telephone number with an indication that the user is ready to receive and/or initiate video calls. Server system 111 also logs any video call preferences.

Subsequently, user system 101 transfers a request for a telephone call over public telephone network 120 to user system 104. This telephone call request could be as simple as picking up a telephone and dialing a telephone number. Public telephone network 120 transfers a telephone call request to user system 104—typically by processing the dialed telephone number to ring a telephone. If user system 104 grants the telephone call request, such as by answering the ringing telephone, a telephone call is established between user systems 101 and 104 over public telephone network 120. In response to the telephone call request, user system 101 transfers a video call request to server system 111. The video call request has the called party telephone number, and some caller identification information, such as user name and password, user telephone number and data address, and any other video call parameters. One such parameter is whether the requested video call is bidirectional or unidirectional. Another parameter is the type of video compression and encryption that is used. Server system 111 uses the called party telephone number to check if the called party is ready to receive video call requests, and since user system 104 has logged-in, server system 111 transfers a video call request to user system 104. User system 104 may then present the called party with a prompt, such as an instant message or tone, to accept the video call request. If the called party accepts the video call request, user system 104 transfers a video call acceptance to server system 111. The acceptance may also have video call preferences for the called party that server system 111 resolves against the preferences of the caller. Server system 111 transfers video call start messages to user systems 101 and 104 indicating the resolved video call parameters. In response to the video call start messages, user systems 101 and 104 generate and transfer video to server system 111. This transferred video has some indicia indicating the caller and called party, so server system 111 can associate the received video with the video call.

Server system 111 uses the user system 104 data address to transfer caller video to user system 104. Server system 111 uses the user system 101 data address to transfer called party video to user system 101. Prior to this transfer, server system may interwork the video to provide compatibility at the receiving end. User systems 101 and 104 receive and display the respective video to establish the video call. Eventually, user systems 101 and 104 indicate telephone call termination to public telephone network 120—typically by hanging-up their telephones. In response to telephone call termination, user system 101 transfers a telephone call termination message to server system 111. In response, server system 111 transfers a video call termination message to user system 104, and systems 101, 104, and 111 terminate the video call. In some cases, user system 104 may detect telephone call termination and transfer a termination message to server system 111 to eliminate the need for the termination message from server system 111.

In one variation to the above system, the actual video transfer may be directly between user systems 101 and 104 over public data network 110. The server system 111 would set-up the video call and provide the appropriate data addresses to user systems 101 and 104 for a peer-to-peer video transfer over public data network 110.

General User System Configuration and Operation—FIGS. 10–13

Figure 10:
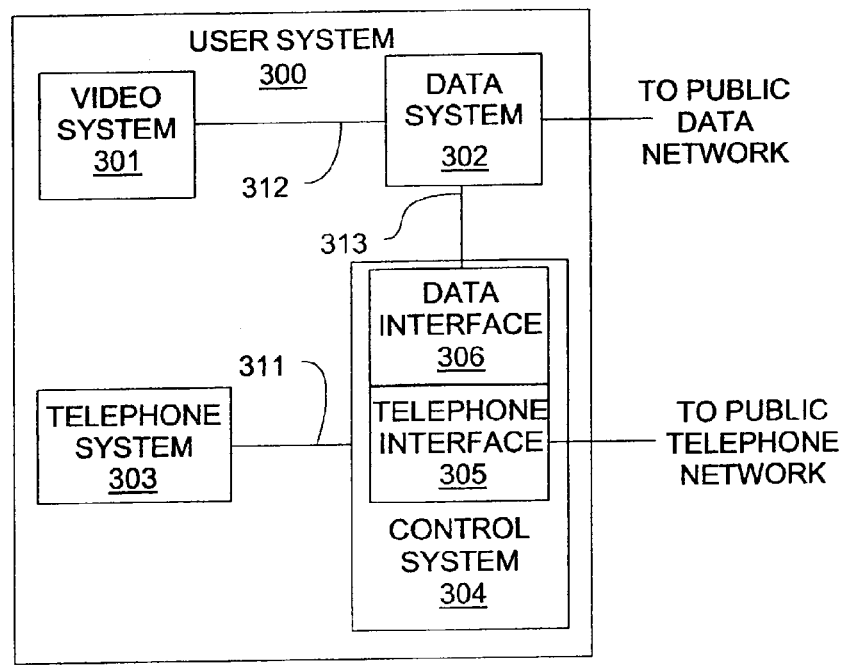
FIG. 10 illustrates a user system in an example of the invention.

FIG. 10 illustrates user system 300 in an example of the invention. User system 300 comprises video system 301, data communication system 302, telephone system 303, and control system 304. Control system 304 comprises telephone interface 305 and data interface 306. Data communication system 302 is coupled to a public data communication network, and telephone interface 305 is coupled to a public telephone network.

Video system 301 could be any system configured to generate and/or display video. Video system 301 may include a camera for generating video of a caller or called party. Video system 301 may include a television or computer monitor to display video. Telephone system 303 could be any system configured to initiate telephone calls over a public telephone network, and could be integrated into other systems, such as computers, appliances, and televisions. Telephone system 303 could utilize wireless, wire-line, optical, or other communication media. Control system 304 could be any system configured to initiate a video call using systems 301–302 in response to the Initiation of a telephone call by telephone 303. Telephone interface 305 is configured to receive a called number from telephone system 303 if the telephone number is contemporaneously used to establish a telephone call over the public telephone network. In response to receiving the called telephone number, data interface 306 is configured to transfer the called telephone number to data communication system 302 for transfer to a server system over the public data network. Data system 302 could be any system configured to transfer the called telephone number to the server system over the public data network and to exchange video between the public data network and video system 301.

It should be appreciated that systems 301–304 could be integrated together or with other systems. Various combinations of equipment could be used to implement user system 300. Some examples of devices that could incorporate data system 302 include, but are not limited to, a computer, set-top box, telephone, network interface card, digital assistant, information appliance, and stand-alone device. Some examples of devices that could incorporate control system 304 include, but are not limited to, a computer, telephone, modem, network interface card, set-top box, and stand-alone device. In addition, the functionality of data system 302 and control system 304 could be provided by a processing system that retrieves and executes software that is stored on a storage system. The storage system could comprise a disk, tape, integrated circuit, server, or some other memory device.

Figure 11:
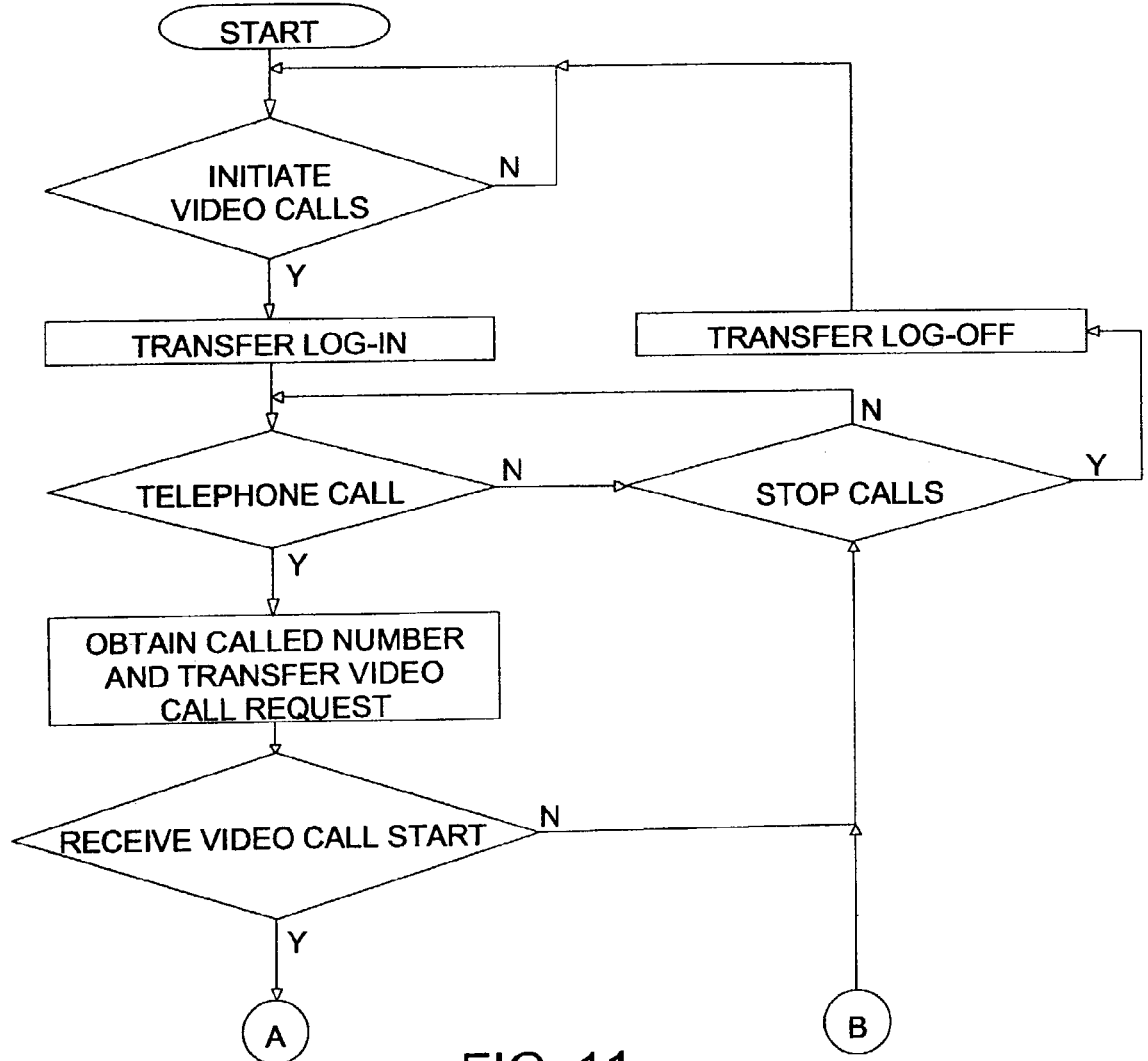
FIG. 11 illustrates user system operation in an example of the invention.
Figure 12:
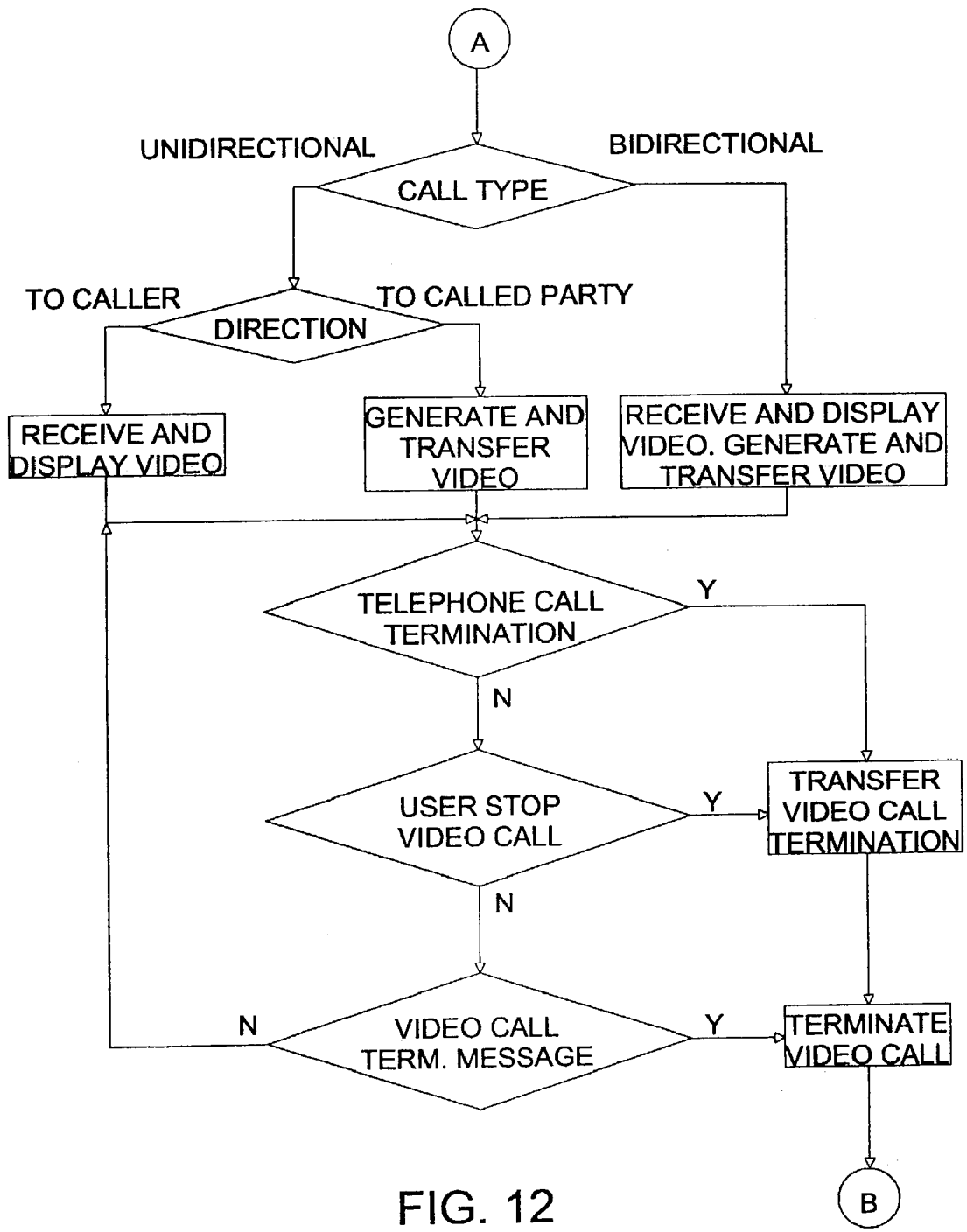
FIG. 12 illustrates user system operation in an example of the invention.

FIGS. 11–12 illustrate the operation for user system 300 to initiate video calls in an example of the invention. User system 300 awaits an indication from the caller to begin initiating video calls. This indication could be an input to any of systems 301–304. In response to the indication, data communication system 302 transfers a log-in message over the public data network to the server system. For example, data communication system 302 could be configured to automatically transfer the log-in message upon system start. The log-in message indicates that user system 300 is ready to initiate video calls, and possibly, to also receive video calls. The log-in message may include information such as the user name and password, user data address and telephone number, video call parameters, and other user data or registration information.

Telephone interface 305 awaits either a telephone call from telephone system 303 to the public telephone network or an indication from the caller to stop initiating video calls. If such a stop indication is received, data interface 302 transfers a log-off message to the server system. For example, data communication system 302 could be configured to automatically transfer the log-off message upon system shutdown. The log-off message indicates that user system 300 is not ready to initiate or receive video calls.

If telephone system 303 initiates a telephone call, telephone interface 305 obtains the called telephone number, and in response, data interface 306 transfers the called number to data communication system 302. Data communication system 302 transfers a video call request to the server system. The video call request includes the called telephone number and other information, such as the caller user name and password, caller telephone number and data address, and video call parameters. The video call parameters indicate if the requested video call is bidirectional or unidirectional, and the direction if unidirectional—caller to called party or called party to caller. The video call parameters may also indicate requested video quality and security. The information in the video call request is populated by control system 304 and/or data communication system 302.

Data communication system 302 then awaits a video call start message. If the video call start message is not received, for example if the video call is unavailable or rejected, telephone interface 305 awaits either a telephone call or an indication from the caller to stop initiating video calls. If received (see FIG. 12), the video call start message indicates the actual video call parameters for the video call. If the video call is bidirectional or unidirectional from caller to called party, then video system 301 generates video of the caller that data communication system 302 transfers the caller to the server system. If the video call is bidirectional or unidirectional from called party to caller, then data communication system 302 receives video from the server system that video system 301 displays. Systems 301–302 would typically apply compression, encryption, and other video technologies to the video.

At this point between the caller and called party, a telephone call exists over the public telephone network and a video call exists over the public data network. If the caller terminates the telephone call, such as by hanging up the telephone, telephone interface 305 determines that the telephone call has been terminated, and as a result, data interface 306 indicates the telephone call termination to data communication system 302. Data communication system 302 then transfers a video call termination message to the server system and video generation, transfer, receipt, and display are terminated by user system 300. The video call is similarly terminated if a video call termination message is received from the server system or if the caller indicates that the video call should be terminated. User system 300 then awaits an additional telephone call or an indication from the caller to stop initiating video call requests.

Figure 13:
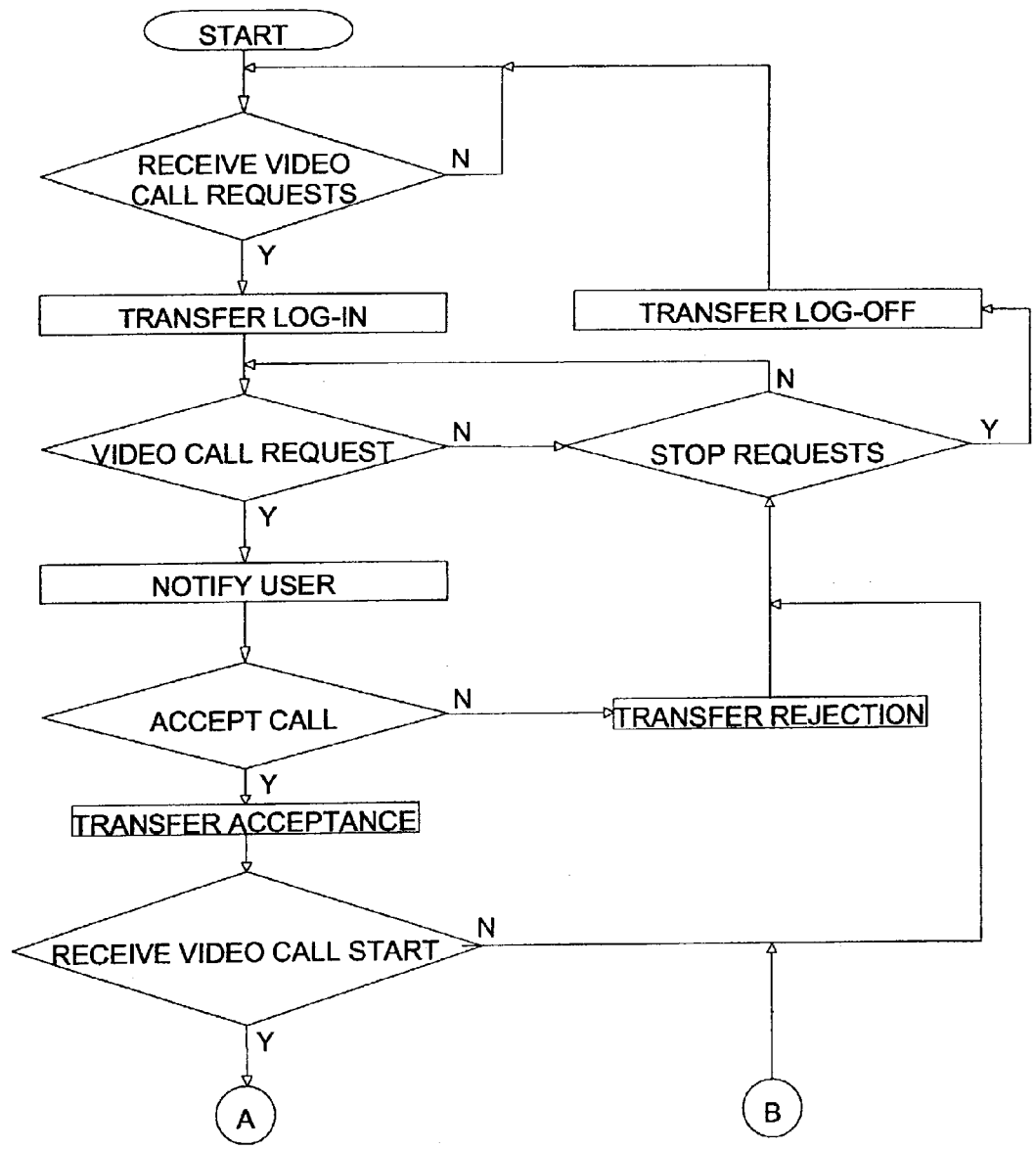
FIG. 13 illustrates user system operation in an example of the invention.

FIGS. 12–13 illustrate the operation for user-system 300 to receive video calls in an example of the invention. In FIG. 13, user system 300 awaits an indication from the user to begin receiving video call requests. This indication could be an input to any of systems 301–304. In response to the start indication, data communication system 302 transfers a log-in message over the public data network to the server system. For example, data communication system 302 could be configured to automatically transfer the log-in message upon system start. The log-in message indicates that user system 300 is ready to receive video call requests, and may include information such as the user name and password, user data address and telephone number, video call parameters, and other user data or registration information. Data interface 302 awaits a video call request from the server system or an indication from the user to stop receiving video call requests. If a stop indication is received, data interface 302 transfers a log-off message to the server system. For example, data communication system 302 could be configured to automatically transfer the log-off message upon system shut-down.

If data communication system 304 receives a video call request, then the user is notified of the requested video call. The notification could be given from any of systems 301–301 and could include screen displays, tones, or other user signals. Although not shown for clarity, telephone system 303 will receive a contemporaneous telephone call from the public telephone network. The user indicates if the telephone call and/or the video call is accepted. Typically, the telephone call is accepted by operating telephone video system 303 to answer the call. The video call may be accepted with an input to one of systems 301–304, such as by pressing, a DTMF key, pressing a button, or selecting from a screen display. User system 300 could be configured to automatically accept or reject the video call based on whether the corresponding telephone call, is answered.

If the video call is not accepted, then data communication system 302 transfers a video call rejection to the server system and awaits either a video call request from the server system or an indication from the user to stop receiving video call requests. If the video call is accepted, then data communication system 302 transfers a video call acceptance to the server system. The video call acceptance may indicate accepted video call parameters. Data communication system 302 then awaits a video call start message indicating the actual parameters for the video call. If the video call start message is received, processing proceeds as indicated above for FIG. 12.

Figure 14:
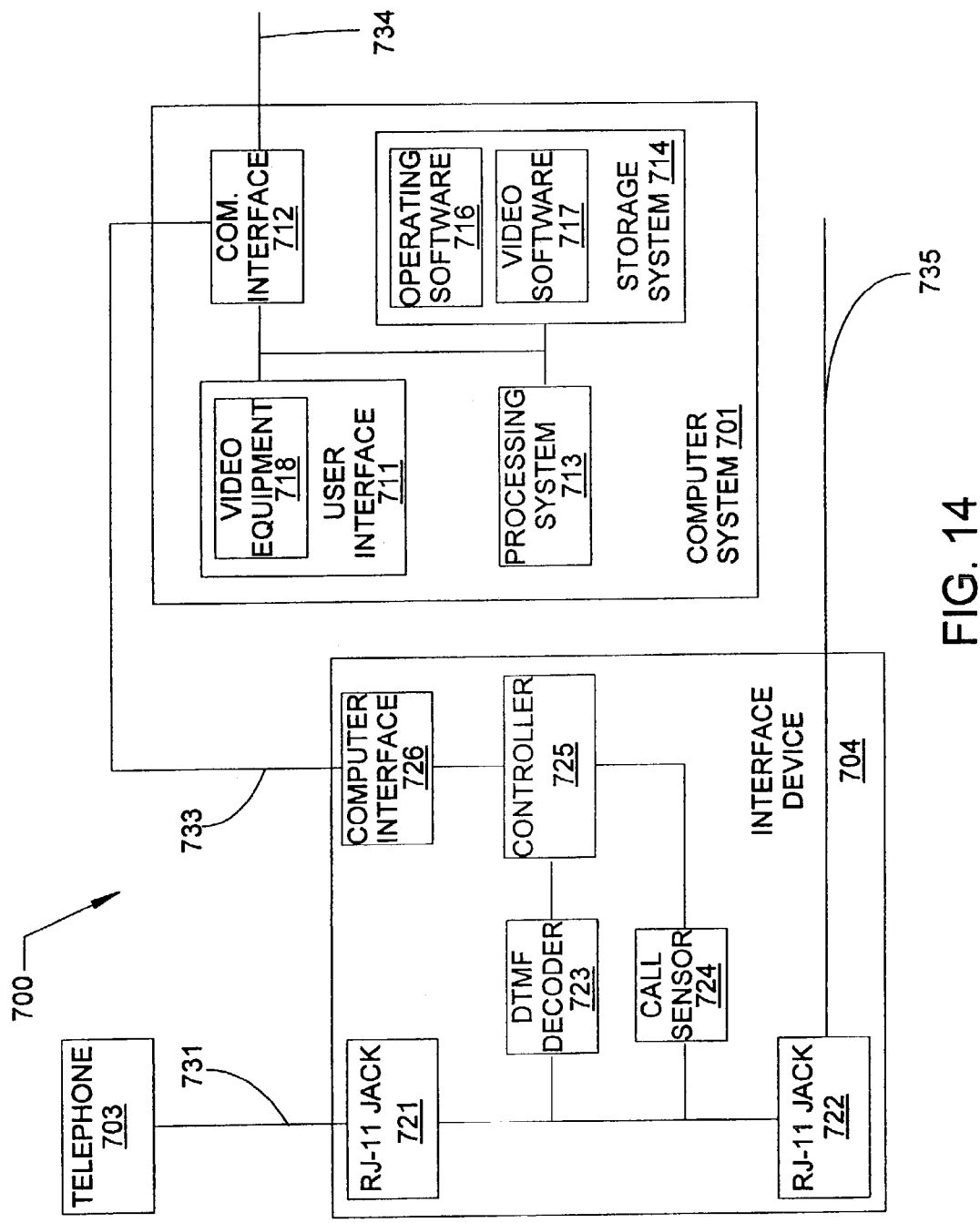
FIG. 14 illustrates a user system in an example of the invention.

User System Incorporating Conventional Telephone and Computer—FIG. 14

FIG. 14 illustrates user system 700 in an example of the invention. Advantageously, user system 700 is configured for use with conventional telephones, personal computers, and communication services. Advantageously, this makes video telephony easy for a user to implement by simply adding one small device to conventional devices and services.

User system 700 includes computer system 701, telephone 703, and interface device 704. Computer system 701 is connected to Internet link 734 that provides Internet service. Telephone 703 is connected to telephone link 731. Telephone link 735 provides telephone service. It should be appreciated that links 734–735 may share the same physical media, especially to egress the user premises. Computer system 701 includes user interface 711, communication interface 712, processing system 713, and storage system 714. User interface 711 includes video equipment 718. Storage system 714 stores operating software 716 and video software 717. Interface device 704 includes RJ-11 jacks 721–722, Dual-Tone Multi-Frequency (DTMF) decoder 723, call sensor 724, controller 725, and computer interface 726. RJ-11 jack 721 is coupled to telephone 703 by telephone link 731. RJ-11 jack 722 is coupled to telephone link 735. Computer interface 726 is coupled to communication interface 712 by Universal Serial Bus (USB) 733. Alternatively, USB 733 could be a serial cable. Communication interface 712 is also coupled to Internet link 734. Computer system 701 uses Transaction Control Protocol port 80 or any other port assigned by the user to exchange messages with the server system.

User interface 711 includes a keyboard and mouse. Video equipment 718 includes a camera and monitor. Communication interface 712 includes a USB or serial port and a Digital Subscriber Line (DSL) modem or some other broadband access system. Processing system 713 includes a computer microprocessor and other circuitry. Storage system 714 includes a hard disk drive and other circuitry. Processing system 713 retrieves and executes operating software 716 and video software 717 from storage system 714. Software 716–717 could comprise an application program, firmware, or some other form of machine-readable processing instructions. Operating software 716 includes an operating system, networking software, and other utilities typically loaded onto a personal computer. When executed by processing system 713, video software 717 directs processing system 713 to operate in accord with the invention.

Interface device 704 could be a stand-alone enclosure that derives power from the telephone line, battery, AC connection, or another source. RJ-11 jacks 721–722, DTMF decoder 723, call sensor 724, and computer interface 726 could be conventional components. Controller 725 comprises processing circuitry configured to operate in accord with the invention. Interface device 704 can be turned on and off to control video call initiation.

In operation, operating software 716 directs processing system to retrieve and execute video software 717 in response to computer start-up or user input. Video software 717 directs processing system 713 to operate as follows. Processing system 713 maintains a set of user options that can be viewed and altered through user interface 711. A table of possible options follows.

| Task | Options |
| --- | --- |
| Log-in | Automatic at system start, upon user input, or upon incoming/outgoing telephone call. |
| Video call initiation | 1. On or off.<br>2. If on, then automatic, automatic using a positive or negative telephone number list, or after user prompt and acceptance.<br>3. Bi-directional or unidirectional, and if unidirectional, then caller to called party or called party to caller. |
| Video call reception | 1. On or off.<br>2. If on, then automatic, automatic using a positive or negative telephone number list, or after user prompt and acceptance.<br>3. Bi-directional or unidirectional, and if unidirectional, then caller to called party or called party to caller. |
| Encryption | 1. On or off.<br>2. If on, then automatic, automatic using a positive or negative telephone number list, or after user prompt and acceptance. |
| Video quality | 1. Various standards that can be used based video transfer or receipt, positive or negative telephone number list, or after user prompt and selection. |

Processing system 713 generates and transfers a log-in message through communication interface and over the public data network to the server system. The login message include user name and password, user telephone number and data address, and video call parameters.

Telephone 703 is operated to transfer DTMF digits to the public telephone network. The public telephone network processes the DTMF digits to extend the call to the called party. DTMF decoder 723 monitors the telephone connection between jacks 721–722 to detect and decode any DTMF tones transmitted by telephone 703 to the public telephone network. DTMF decoder 723 indicates the decoded digits to controller 725. Controller 725 forms the called number from the decoded digits and transfers a telephone call initiation message through computer interface 726 and USB connection 733.

Processing system 713 receives the telephone call initiation message from communication interface 712. Processing system 713 implements the video call initiation options, and if the video call should proceed, processing system 713 generates a video call request including the called telephone number, user name and password, user data address and telephone number, and video call parameters. Processing system 713 transfers the video call request message through communication interface 712 to Internet link 734 for delivery to the server system over the Internet. Processing system 713 then awaits a video call start message from the server system with the parameters for the video call. When the video call start message is received, processing system implements the video call parameters and user options. For a bidirectional video call, processing system 713 directs the exchange of video between video equipment 718 and Internet link 734. Video equipment 718 displays the video.

Eventually, telephone 703 is placed on-hook. Call sensor 724 monitors the telephone connection between jacks 721–722 to detect the on-hook condition. Typically, call sensor 724 monitors line current to detect off-hook and on-hook conditions. Call sensor 724 indicates the on-hook condition to controller 725. Controller 725 transfers a telephone call termination message through computer interface 726 and USB connection 733.

Processing system 713 receives the telephone call termination message through communication interface 712. In response, processing system 713 generates and transfers a video call termination message through communication interface 712 to Internet link 734 for delivery to the server system over the Internet. Processing system 713 directs video equipment 718 to stop the generation and display of video.

It should be appreciated that the user may operate their telephone in the normal manner and corresponding video calls are automatically established over the Internet. The telephone calls provides the audio, and the Internet connection transfers the video. As indicated, options are available to exert various levels of user control over the process.

To receive a video call, processing system 713 receives a video call request from the server system over Internet link 734 and through communication interface 712. Processing system 713 implements any user options and may notify the user through user interface 711 or video equipment 718. If the video call is accepted, processing system 713 transfers a video call acceptance to the server system through communication interface 712 and over Internet link 734.

When the video call start message is received, processing system 713 implements the video call parameters and user options. For a bidirectional video call, processing system 713 directs the exchange of video between video equipment 718 and Internet link 734. Video equipment 718 displays the video. Video call termination may proceed as indicated above or a video call termination message may be received from the server system. If a video call termination message is received, then processing system 713 directs video equipment 718 to stop the generation and display of video.

It should be appreciated that the user may invoke video software 717 to dynamically control video calls. For example, video software 717 may allow the user to terminate video calls in one or both directions during the call. Video software 717 may allow the user to adjust user options during the call. Video software 717 may allow the user to initiate a previously rejected video call during the telephone call. Computer system 701, telephone 703, and interface device 704 can be configured to operate together for additional user control. In such a scenario, the user could transfer DTMF digits that are decoded by interface device 704 and transferred to computer system 701 to exert control. For example, incoming video calls could be accepted or rejected by transferring specific DTMF sequences from telephone 703. Video calls could be terminated by the user in a similar fashion.

Interface device 704 could be further equipped with a tone generator to alert the user to various conditions. For example, interface device 704 could transfer a special tone to telephone link 731 for the user to hear to indicate that a video call is available for the telephone call. The tone could be played in response to a video call request or start message from the server system.

Figure 15:
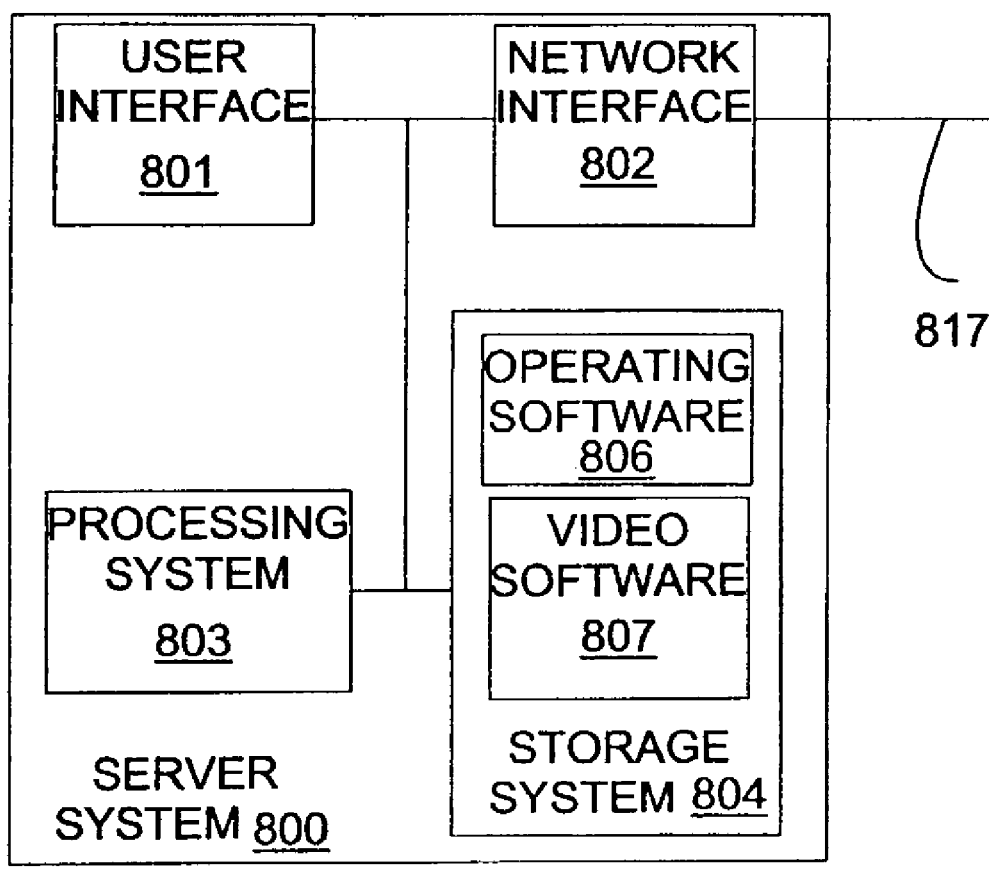
FIG. 15 illustrates a server system in an example of the invention.
Figure 16:
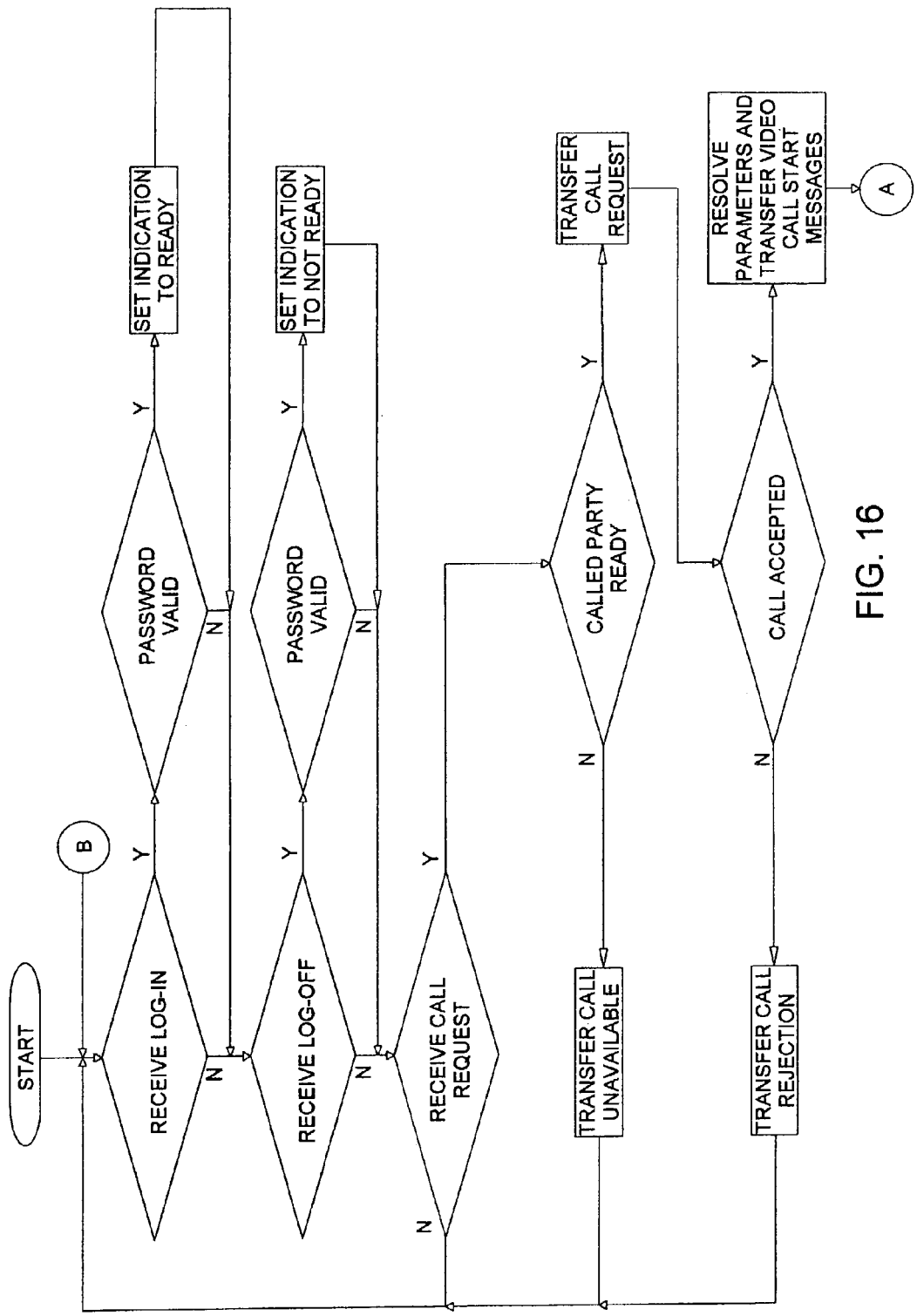
FIG. 16 illustrates server system operation in an example of the invention.
Figure 17:
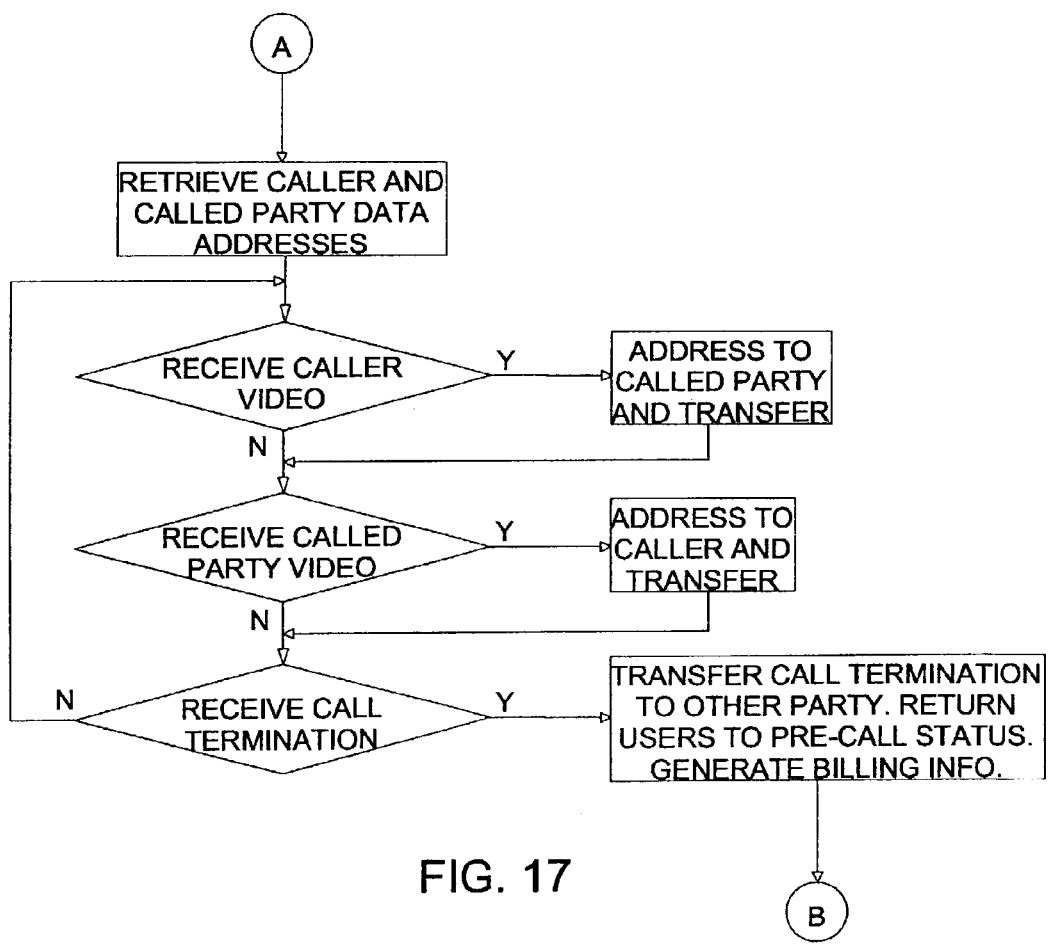
FIG. 17 illustrates server system operation in an example of the invention.

Server System—FIGS. 15–17

FIG. 15 illustrates server system 800 in an example of the invention. Server system 800 includes user interface 801, network interface 802, processing system 803, and storage system 804. Storage system 804 stores operating software 806 and video software 807. Network interface 802 is coupled to Internet connection 817. Processing system 803 uses network interface 802 to communicate over the Internet with user systems.

Processing system 803 retrieves and executes operating software 806 and video software 807 from storage system 804. Software 806–807 could comprise an application program, firmware, or some other form of machine-readable processing instructions. Operating software 806 includes an operating system, networking software, and other utilities typically loaded onto an Internet server. When executed by processing system 803, video software 807 directs processing system 803 to control server system 800 in accord with the invention.

FIGS. 16–17 illustrate server system 800 operation in an example of the invention. Server system 800 maintains a database of users including user names and passwords, user telephone numbers and data addresses, and possibly user preferences. If server system 800 receives a log-in message, the user password is checked and if it is valid, the user database is modified to indicate that the user is ready to initiate and/or receive video calls. If server system 800 receives a log-off message, then the user password is checked and if it is valid, the user database is modified to indicate that the user is not ready to initiate and/or receive video calls. The user database may also be modified by querying the users and receiving responses indicating user video call specifications.

If server system 800 receives a video-call request, the user database is checked using the called telephone number from the request to determine if the called party is ready to receive video calls. If not, a video call unavailable message is returned to the caller. If so, server system 800 sends a video call request to the called party. If a video call rejection is received from the called party, then server system 800 sends a video call rejection to the caller. If a video call acceptance is received from the called party, server system resolves video call parameters and sends video call start messages to both the caller and called party including the video call parameters. Parameter resolution may entail determining if the caller will receive called party video. If so, this is indicated in the video start messages.

Server system 800 uses the called party telephone number to retrieve the called party data address. Server system 800 may use the caller telephone number to retrieve the caller data address. If server system 800 receives video from the caller, it addresses the caller video to the called party data address and transfers the caller video for delivery to the called party. If server system 800 receives video from the called party, it addresses the called party video to the caller data address and transfers the called party video for delivery to the caller. In some cases, it may be necessary for processing system 803 to interwork the video so it is compatible with both caller and called party. For example, the caller and called party may use different quality or encryption levels that are interworked by processing system 803.

If server system 800 receives a video call termination message from one user, it transfers a video call termination message to the other user. Server system 800 then modifies the database to return each user to their pre-call status. Server system also generates billing information for the video call.

Server system 800 may be configured to download software to the user systems. The software could be the video software used to control the user systems as described above. The software could provide upgrades from older versions. The software could provide video processing, compression, and encryption. The software could provide system diagnostics and trouble-shooting to recommend optimal system software and settings.

It should be appreciated that the processing and control discussed above could be distributed in various ways between the user system and the server system. For example, the server system could maintain and implement user preferences and provide user prompts.

What is claimed is:

1. A method of connecting at least two users for exchanging video data messages via an internetwork, each user having a respective assigned IP address for said internetwork and a respective assigned telephone identifier number for a public-switched telephone network, said method comprising the steps of:

maintaining in a server coupled to said internetwork a database of registered users, said database including for each registered user a respective telephone identifier number and a respective IP address;

maintaining active connection sessions between said server and each registered user that is available any a particular time;

receiving an access request in said server from a requesting user to establish a data transfer to a desired user on said internetwork, said access request including a target telephone identifier number associated with said desired user;

comparing said target telephone identifier number with said telephone identifier numbers in said database;

if said target telephone identifier number is found in said database, then forwarding an initiation message to said desired user using a respective IP address stored in said database;

said desired user sending an accept message in response to said initiation message if said desired user wishes to exchange video said data messages with said requesting user; and said server relaying said video data messages between said users, whereby said video data messages are exchanged without said users having direct access to the IP address of each other.

2. The method of claim 1 wherein said access request identifies to said server a requesting user who is a registered user, and wherein said initiation message identifies said requesting user to said desired user.

3. The method of claim 1 further comprising the step of:
adding a new registered user to said database in response to a registration request, wherein said registration request includes a respective IP address assigned to said new registered user.

4. The method of claim 1 further comprising the step of:
adding a new registered user to said database in response to a registration request, wherein said registration request includes a respective telephone identifier number assigned to said new registered user.

5. The method of claim 1 wherein said access request is initiated by an integrated access device which identifies said target telephone identifier number in response to a call placed to said desired user over said public-switched telephone network.

6. The method of claim 1 wherein said server controls a private branch exchange (PBX) connected to said public-switched telephone network, said method further comprising the step of:
said server commanding said PBX to establish a call using said target telephone identifier number.

7. The method of claim 6 wherein said server sends said initiation message after said PBX call is answered.

8. A method of exchanging video data between two individuals over an internetwork simultaneously with exchange of audio data between said two individuals over a telephone network, said method comprising the steps of:

a first individual logging-on to a central server with a first computer coupled to said internetwork so that said central server registers a first IP address and a first telephone number associated with said first individual;

a second individual logging-on to said central server with a second computer coupled to said internetwork so that said central server registers a second IP address and a second telephone number associated with said second individual;

maintaining active connection sessions between said central server and said first and second computers;

initiating a telephone call between said first individual and said second individual, said second individual being a called party of said telephone call;

sending an initiation message from said central server to said second IP address;

sending an approval message from said second individual to said central server; and said central server relaying said exchanged video data between said first and second computers, whereby said first and second computers exchange said video data without direct access to the IP address of the other.

9. The method of claim 8 wherein said telephone call is initiated by said first individual as a calling party using a first telephone, wherein said first computer sends an access request including said second telephone number to said central server in response to said initiation of said telephone call, and wherein said central server selects said second IP address in response to said second telephone number.

10. The method of claim 9 wherein said first telephone is coupled to an integrated access device, said integrated access device sending said second telephone number to said first computer.

11. The method of claim 8 wherein said telephone call is initiated in response to an access request received by said central server over said internetwork, wherein said access request identifies said first and second individuals, and wherein said server initiates said telephone call using a public branch exchange (PBX).

12. A method of operating a server system for transfer of caller video data over a computer network, the method comprising:

maintaining active connection sessions between said server system and each registered user that is available any a particular time;

receiving a first message indicating a called telephone number from a public data network wherein a caller is associated with a caller data address and a caller telephone number, wherein a called party is associated with a called party data address and the called telephone number, and wherein the called telephone number is contemporaneously used to establish a telephone call between the caller and the called party over a public telephone network;

processing the called telephone number from the first message to determine if the called party is a registered user with an active connection session and if the called party will receive caller video data;

if the called party will receive the caller video data, transferring a second message to the public data network for delivery to the called party wherein the second message indicates that the caller video data will be transferred to the called party, and transferring a third message to the public data network for delivery to the caller wherein the third message indicates that the caller video data will be delivered to the called party;

receiving the caller video data from the called party at the server system via the public data network;

addressing the caller video data to the called party data address; and transferring the caller video data from the server system to the public data network for delivery to the called party.

13. A method of operating a server system for video telephony, the method comprising:

maintaining a database of user telephone numbers and associated user data addresses;

maintaining active connection sessions with users who are available to receive video data; and establishing video data exchanges between callers and called parties over a public data network in response to messages indicating called telephone numbers contemporaneously used to establish telephone calls between the callers and the called parties over a public telephone network;

wherein establishing the video data exchanges comprises receiving the video data from the public data network into the server system, addressing the video data from the callers to the called parties, addressing the video data from the called parties to the callers, and transferring the video data from the server system to the public data network for delivery to the callers and called parties based on the addressing.

* * * * *